US012214352B1

(12) United States Patent
Lew et al.

(10) Patent No.: US 12,214,352 B1
(45) Date of Patent: Feb. 4, 2025

(54) MICROFLUIDIC CHIP HOLDERS AND METHODS OF REMOVING CHIPS THEREFROM

(71) Applicant: 10x Genomics, Inc., Pleasanton, CA (US)

(72) Inventors: Jennifer Lew, Dublin, CA (US); Joaquin Trosper-Torres, Sunol, CA (US); Liza S. Man, San Mateo, CA (US); Alexander Post Kindwall, Pleasanton, CA (US); Kevin Gilmartin, Belmont, CA (US); David Morgan, San Leandro, CA (US)

(73) Assignee: 10x Genomics, Inc., Pleasanton, CA (US)

( * ) Notice: Subject to any disclaimer, the term of this patent is extended or adjusted under 35 U.S.C. 154(b) by 137 days.

(21) Appl. No.: 17/685,694

(22) Filed: Mar. 3, 2022

Related U.S. Application Data

(60) Provisional application No. 63/156,051, filed on Mar. 3, 2021.

(51) Int. Cl.
*B01L 9/00* (2006.01)

(52) U.S. Cl.
CPC ......... *B01L 9/527* (2013.01); *B01L 2200/025* (2013.01); *B01L 2200/04* (2013.01); *B01L 2300/046* (2013.01); *B01L 2300/0609* (2013.01)

(58) Field of Classification Search
CPC ............... B01L 9/527; B01L 2200/025; B01L 2000/04; B01L 2300/046; B01L 2300/0609
See application file for complete search history.

(56) References Cited

U.S. PATENT DOCUMENTS

| | | | | |
|---|---|---|---|---|
| 9,975,122 | B2 | 5/2018 | Masquelier et al. | |
| 10,245,587 | B2 | 4/2019 | Masquelier et al. | |
| 10,520,432 | B2 * | 12/2019 | Cooper | G01N 21/474 |
| 11,135,584 | B2 | 10/2021 | Masquelier et al. | |
| 2006/0094108 | A1 | 5/2006 | Yoder et al. | |
| 2012/0043716 | A1 * | 2/2012 | Morikawa | B65H 3/0669 271/264 |
| 2016/0121325 | A1 * | 5/2016 | Masquelier | B01L 3/50273 422/561 |
| 2022/0097045 | A1 | 3/2022 | Masquelier et al. | |

* cited by examiner

*Primary Examiner* — Jill A Warden
*Assistant Examiner* — Michael Stanley Gzybowski
(74) *Attorney, Agent, or Firm* — Clark & Elbing LLP

(57) ABSTRACT

The invention provides microfluidic chip holders, systems containing them, and methods of microfluidic chip removal therefrom that allow easy, reproducible release and removal of microfluidic chips from the holders. Holders of the invention include latching mechanisms that hold a chip securely in position when locked and eject the chip when unlocked, allowing easier grasping of the chip and reducing the likelihood that the fluidic contents of the chip are disturbed during removal.

10 Claims, 9 Drawing Sheets

Bottom view

Chip IN

Chip OUT

MICROFLUIDIC CHIP HOLDERS AND METHODS OF REMOVING CHIPS THEREFROM

BACKGROUND OF THE INVENTION

Many biomedical applications make use of microfluidic chips. Microfluidic chips may require holders to integrate with, e.g., automated systems, or assist with liquid handling, protect chips during transport, etc. There is a risk of damaging the chips or disturbing the reagents or processes within when removing them from the holder.

Improved holders and methods of removing chips from them would be beneficial.

SUMMARY OF THE INVENTION

The invention provides microfluidic chip holders, systems thereof, and methods of their use.

In one aspect, the invention provides a method of separating a microfluidic chip from a microfluidic chip holder. The method includes providing the microfluidic chip holder including a receptacle with a base, e.g., substantially flat, that holds the microfluidic chip in a planar conformation and a latching mechanism including a latch that holds the chip in the receptacle and is mechanically coupled to an effort side of a lever with a resistance side under an edge or a catching feature on the edge of the chip; pressing laterally or annularly on the latch to withdraw the latch and apply downward force on the effort side of the lever, thereby releasing and raising the microfluidic chip; and lifting the raised microfluidic chip out of the secondary holder.

In certain embodiments, the pressing raises the edge of the microfluidic chip in contact with the lever such that the microfluidic chip and the base of the chip holder make an angle that is less than 2°. In some embodiments, the pressing raises the edge of the microfluidic chip about 0.5 to 2 mm from the base. In some embodiments, the latching mechanism includes a spring, and the pressing applies stress to the spring to withdraw the latch. In particular embodiments, the latching mechanism includes a fulcrum between the effort and resistance sides of the lever, and the pressing includes causing the lever to pivot on the fulcrum. In certain embodiments, the method includes moving, e.g., annularly or laterally, a projection on the latch that is disposed at least partially within a groove in the lever against a side of the groove that is on the effort side of the lever.

In certain embodiments, the lever is a compound lever including two or more mechanically coupled pivot points, and the pressing includes transferring lateral or annular pressure from the latch to the effort side of the lever through the one or more mechanically coupled pivot points.

In some embodiments, the latch includes one or more features to increase friction between a top portion of the latch and a finger or thumb when lateral or annular pressure is applied.

In some embodiments, the method further includes lifting a cover that at least partially covers the microfluidic chip when in the receptacle before pressing laterally or annularly on the latch.

In another aspect, the invention provides a microfluidic chip holder that includes a receptacle with a base, e.g., substantially flat, configured to hold a microfluidic chip in a substantially planar conformation and a latching mechanism including a latch and a lever having an effort side and a resistance side. The latch is mechanically coupled to the effort side, and the resistance side is disposed beneath an edge or a catching feature on the edge of the microfluidic chip when in the receptacle. Lateral or annular movement of the latch applies downward force on the effort side of the lever thereby raising the resistance side of the lever and ejecting the microfluidic chip from the receptacle.

In some embodiments, the lever is configured to raise the edge of the microfluidic chip to make an angle that is less than 2° with the base. In some embodiments, the lever is configured to raise the edge of the microfluidic chip by about 0.5 to 2 mm. In certain embodiments, the lever is configured to raise the edge of the microfluidic chip by about 1 mm.

In some embodiments, the latching mechanism includes a spring. In some embodiments, the latching mechanism includes a fulcrum. In some embodiments, the lever includes a groove, and the latch includes a projection disposed at least partially within the groove. In certain embodiments, the lever is a compound lever. In some embodiments, the latch includes a visual marker. In some embodiments, the latch includes one or more features to increase friction between a top portion of the latch and a finger or thumb when lateral or annular pressure is applied.

In some embodiments, the holder includes a cover that at least partially covers the microfluidic chip when in the receptacle. In certain embodiments, the cover is hinged. In particular embodiments, the cover includes a locking mechanism. In certain embodiments, the cover is rotatable behind the holder to act as a stand.

Another aspect of the invention provides a method of separating a microfluidic chip from a microfluidic chip holder. The method includes providing the microfluidic chip holder including a receptacle with a base, e.g., substantially flat, that holds the microfluidic chip in a planar conformation and a latching mechanism including a latch that is mechanically coupled to a wedge and a void having a depth in the base disposed to receive the wedge, where the wedge has a height that is greater than the depth of the void and the void extends under the microfluidic chip when in the receptacle; pressing laterally or annularly on the latch to both withdraw the latch and drive the wedge into the void to lift an edge of the microfluidic chip; and lifting the raised microfluidic chip out of the secondary holder.

In some embodiments, the pressing raises the microfluidic chip to make an angle that is less than 2° with the base. In certain embodiments, the pressing raises the edge of the microfluidic chip by about 0.5 to 2 mm, e.g., by about 1 mm.

In some embodiments, the latching mechanism includes a spring, and the pressing applies stress to the spring to withdraw the latch. In some embodiments, the pressing rotates the latch and wedge about a pivot pin in the latching mechanism. In some embodiments, pressing causes the edge of the microfluidic chip to slide up a curved or straight slope of the wedge as the wedge is driven into the void.

In some embodiments, the latch includes one or more features to increase friction between a top portion of the latch and a finger or thumb when lateral or annular pressure is applied. In some embodiments, the method includes lifting a cover that at least partially covers the microfluidic chip when in the receptacle before pressing laterally or annularly on the latch.

Another aspect of the invention provides a microfluidic chip holder. The holder includes a receptacle with a base, e.g., substantially flat, configured to hold a microfluidic chip in a substantially planar conformation; a latching mechanism including a latch that is mechanically coupled to a wedge; and a void having a depth in the base disposed to receive the wedge. The wedge has a height that is greater than the depth of the void; where the void extends under the microfluidic chip when in the receptacle, and where lateral or annular movement of the latch drives the wedge into the void to lift an edge of the microfluidic chip and eject the microfluidic chip from the receptacle.

In some embodiments, the wedge height is configured to raise the edge of the microfluidic chip to make an angle that is less than 2° with the base. In certain embodiments, the wedge height is configured to raise the edge of the microfluidic chip by about 0.5 to 2 mm, e.g., by about 1 mm.

In some embodiments, the latching mechanism includes a spring. In some embodiments, the latching mechanism includes a pivot pin. In certain embodiments, the wedge includes a slope that is curved or straight. In some embodiments, the latch includes a visual marker. In certain embodiments, the latch includes one or more features to increase friction between a top portion of the latch and a finger or thumb when lateral or annular pressure is applied.

In some embodiments, the holder includes a cover that at least partially covers the microfluidic chip when in the receptacle. In certain embodiments, the cover is hinged. In particular embodiments, the cover includes a locking mechanism. In particular embodiments, the cover is rotatable behind the holder to act as a stand.

Another aspect of the invention provides a system including any microfluidic chip holder of the invention and a microfluidic chip disposed in the receptacle.

In embodiments of the system, the microfluidic chip includes a computer readable memory.

Definitions

The following definitions are provided for specific terms, which are used in the disclosure of the present invention:

Where values are described as ranges, it will be understood that such disclosure includes the disclosure of all possible sub-ranges within such ranges, as well as specific numerical values that fall within such ranges irrespective of whether a specific numerical value or specific sub-range is expressly stated.

The term "about," as used herein, refers to +10% of a recited value.

The term "mechanically coupled," as used herein, refers to components that are so arranged that action upon one, e.g., pressing, results in some corresponding action in another (or several others), for example, two levers arranged such that the resistance side of one applies pressure to the effort side of another.

The term "substantially flat," as used herein, refers to a surface that corresponds closely to (e.g., deviates less than about ±2° (e.g., less than about ±1.5°, ±1°, ±0.5°, or ±) 0.1° relative to) a plane, or allows a chip to resting thereon to be parallel to (e.g., deviating less than about +2° (e.g., less than about ±1.5°, ±1°, ±0.5°, or ±0.1°) relative to) the plane. For example, a substantially flat base, if not close to planar across the entirety of its surface, may have protrusions and depressions that allow, e.g., a microfluidic chip on the base to be level, e.g., having protrusion, depressions, voids, etc., that are complementary to or do not interact with the underside of a microfluidic chip.

The term "compound lever," as used herein, refers to a lever with more than one effort side and more than one resistance side or a plurality of mechanically coupled levers.

BRIEF DESCRIPTION OF THE DRAWINGS

FIG. 8A shows the relative positions of a latching mechanism when the chip is in vs when the chip is out.

DETAILED DESCRIPTION OF THE INVENTION

The invention provides microfluidic chip holders, systems containing them, and methods of removing microfluidic chips therefrom. Holders of the invention include latching mechanisms that hold a chip securely in position when locked and eject the chip when unlocked. Holders of the invention, and methods and systems therewith, allow easy, reproducible release and removal of microfluidic chips. The release may lift one side of the chip at a small angle to allow easier grasping of the chip and to reduce the likelihood that the fluidic contents of the chip are disturbed.

Holders

Microfluidic chip holders of the invention include a receptacle in which the chip may reside and a latch to keep the chip in the receptacle. The latching mechanism includes a latch and one or more other components to raise the chip as the latch is released, e.g., a lever or wedge. The receptacle contains a base, e.g., that is substantially flat, to hold the chip, e.g., in a planar configuration. Alternatively or in addition, the receptacle may include voids or projections disposed to mate with complementary features of the chip. The holder may include one or more voids, e.g., in the receptacle, to accommodate or receive components of the latching mechanism, e.g., a lever or wedge (see, e.g., FIGS. 3A and 3B or FIGS. 7A and 7B). The base may allow the holder to keep the chip substantially parallel to, e.g., deviating less than about ±2° (e.g., less than about ±1.5°, ±1°, ±0.5°, or ±0.1°) relative to, the plane of, e.g., a work bench, instrument loading deck, etc., or so that a top surface of the chip is substantially perpendicular to, e.g., deviating less than about ±2° (e.g., less than about ±1.5°, ±1°, ±0.5°, or ±0.1°), the direction of force applied by a pneumatic manifold on a gasket in contact with the chip and the manifold. The substantially flat base may include features, e.g., depressions, protrusions, voids, etc., that are complementary to the microfluidic chip or do not interact with the underside of the microfluidic chip. For example, a substantially flat base may include, e.g., holes for ventilation or access or pins for alignment.

Figure 9A:
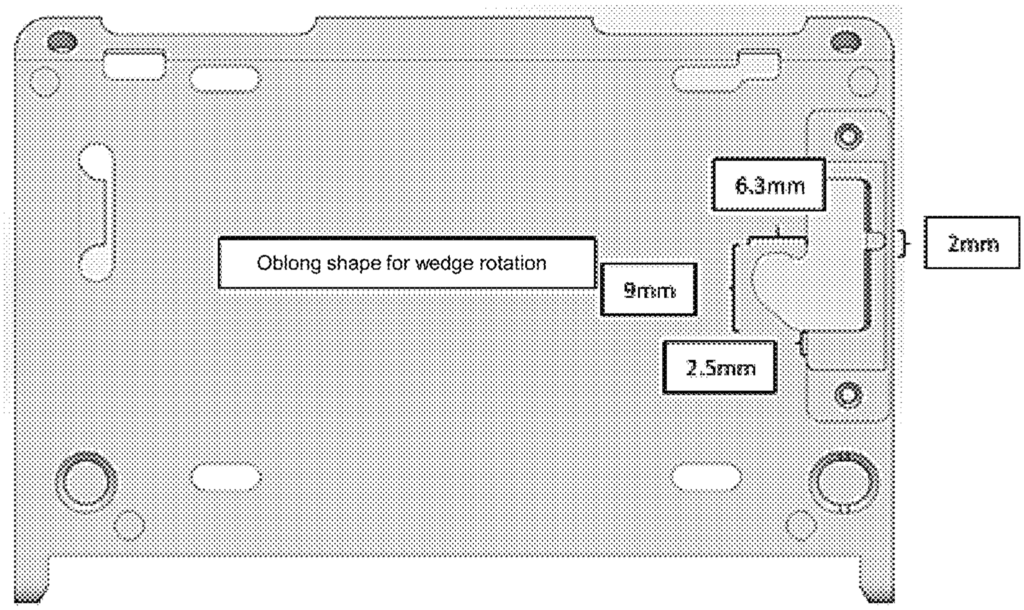
FIG. 9A is a schematic drawing showing the bottom view of a holder of the invention including a latching mechanism 210 with a wedge 211.
Figure 9B:
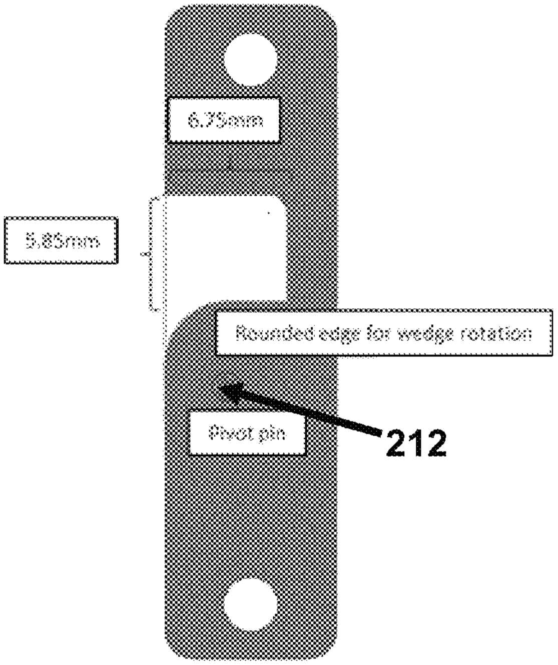
FIG. 9B is a schematic drawing showing a complementary top for the latching mechanism of the holder shown in FIG. 9A.

Holders may include a cover 140 that, at least partially, covers the microfluidic chip, e.g., to protect the chip, prevent contamination, or to act as an additional barrier to unwanted ejection of the chip, e.g., during manipulation or transport. A cover may cover the entire chip or may have an opening to allow access to the chip, e.g., to add or remove fluidic contents via pipette. Covers of the invention may include a locking mechanism, e.g., a latch, clasp, press stud(s), snap-fits, etc. Covers may include one or more features that allow the cover to be rotated to make a stand, e.g., hinges 150, flexible linkages, etc. When acting as a stand, the cover may prop the holder up at a desired angle (e.g., from 20-70 degrees, 30-60 degrees, 40-50 degrees, such as about 45 degrees), e.g., to aid in removal or addition of fluidic contents. Locking mechanisms may lock the cover closed or in a standing position, or both. Exemplary covers are described in U.S. Pat. No. 10,245,587, which is hereby incorporated by reference. Holders of the invention may include additional features, e.g., features to help retain the chip, e.g., one or more of a latch, catch, ridge, lip, U-clip 120), etc., or a combination thereof in the receptacle disposed to prevent vertical motion of one or more parts of the chip while in the receptacle (see, e.g., FIG. 5 or FIG. 9A). Holders of the invention may include multiple latching mechanisms of the invention (e.g., two). Holders of the invention may include labels or areas for labels 130 or areas for manual holding.

Holders may be made of any suitable material such as metal or plastic or a combination thereof.

Latching Mechanism

The latching mechanism is disposed in the holder to hold the chip in place in the receptacle in the closed state and to raise the chip when the latch is released.

A latch of the invention may be any suitable shape, e.g., rectangular, wedge-shaped, curved, rounded, etc. A latch may prevent the release of a chip by, e.g., interengagement with, e.g., a recess, void, lip, etc., of the chip. Alternatively or in addition, a latch may cover or exert pressure to a part of a top surface of the chip. Alternatively or in addition, a latch may exert lateral pressure to an edge of the chip. Latches may include features to enhance pressure exerted on the chip, e.g., kerfs, detents, balls, roughened portions, etc. Such features may be configured to engage with complimentary features on the chip. Latches of the invention may include features (e.g., a projection) that engage with complimentary features (e.g., a groove, slope, paddle, ridge, ledge, shelf, etc.) on a lever to, e.g., transfer mechanical advantage to the lever. Latches may include one or more features (e.g., ridges, rubberized portions, kerfs, chevrons, indents, roughened portions, etc.) to increase friction between a finger or thumb and the latch. Latches may also include one or more visual markers, e.g., arrows, lettering, etc. Visual markers may be, or include, the one of more features for increasing friction (e.g., ridges, rubberized portions, kerfs, chevrons, indents, roughened portions, etc.).

The latching mechanism may include a lever mechanically coupled to the latch. The lever acts to raise the chip, or a portion of the chip, e.g., an edge, to a certain height from the base of the receptacle, or a to make a certain angle between the base of the receptacle and the bottom of the chip, e.g., between a plane running through the center of the chip and a plane running parallel to the base of the receptacle. Levers have an effort side (e.g., a side that is pushed on, e.g., by the mechanically coupled latch) and a resistance side (e.g., a side that pushes, e.g., pushes up the chip) on opposite sides of a pivot point (e.g., a fulcrum). The pivot point may be a pivot pin, a fulcrum, a bend or inflection point, a hinge, etc.

A lever of the invention may be a compound lever, e.g., containing two or more mechanically coupled levers. For example, a first lever with a first effort side and first resistance side with a first fulcrum therebetween and a second lever with a second effort side and a second resistance side, where the second resistance side applies force to the first effort side when force is applied to the second effort side. A compound lever may include one or more linkages between two or more component levers therein. Levers of the invention may include a groove into which a complementary projection of the latch may rest (see, e.g., FIGS. 4A and 4B), arranged such that lateral motion of the projection presses against a side of the groove, thereby driving down the effort side of the lever when the latch is withdrawn. Levers of the invention may reside within a void in the housing, e.g., base of the receptacle, when the latch is in the closed position.

An exemplary latching mechanism 110 with a lever 111 is shown in FIGS. 3A, 3B, 4A, and 4B in both closed (FIG. 3A and FIG. 4A) and open (FIG. 3B and FIG. 4B) positions. This latching mechanism includes a latch disposed to slide laterally parallel to the base with a rounded protrusion 113 on the underside. The rounded protrusion fits partially within a groove 112 on the top side of a lever. The lever sits on top of a fulcrum 114 which also resides partially within a groove on the underside of the lever. Here, the resistance side of the lever rests partially in a void in the base when the latch is in the closed position. A compression spring 115 in contact with the latch presses the latch into the closed position (and the lever into the down position due to mechanical coupling between the lever and latch by interaction of the protrusion on each). When lateral pressure is applied to the latch, the spring 115 is compressed, the latch is withdrawn, and the lever 111 is raised by mechanical coupled transfer of mechanical advantage through the interaction of the protrusion on the latch and the surface of the effort side of the fulcrum 114.

Latching mechanisms may include a wedge 211 (e.g., with a straight or curved slope) mechanically coupled to the latch. The latching mechanism 210 may be configured such that lateral or annular motion of the latch drives the wedge into a void at least partially underneath the chip. The wedge may have a height that is greater than the depth of the void, causing a microfluidic chip in the receptacle to be raised, e.g., by an edge of the chip sliding up the straight or curved slope of the wedge.

Figure 8A:
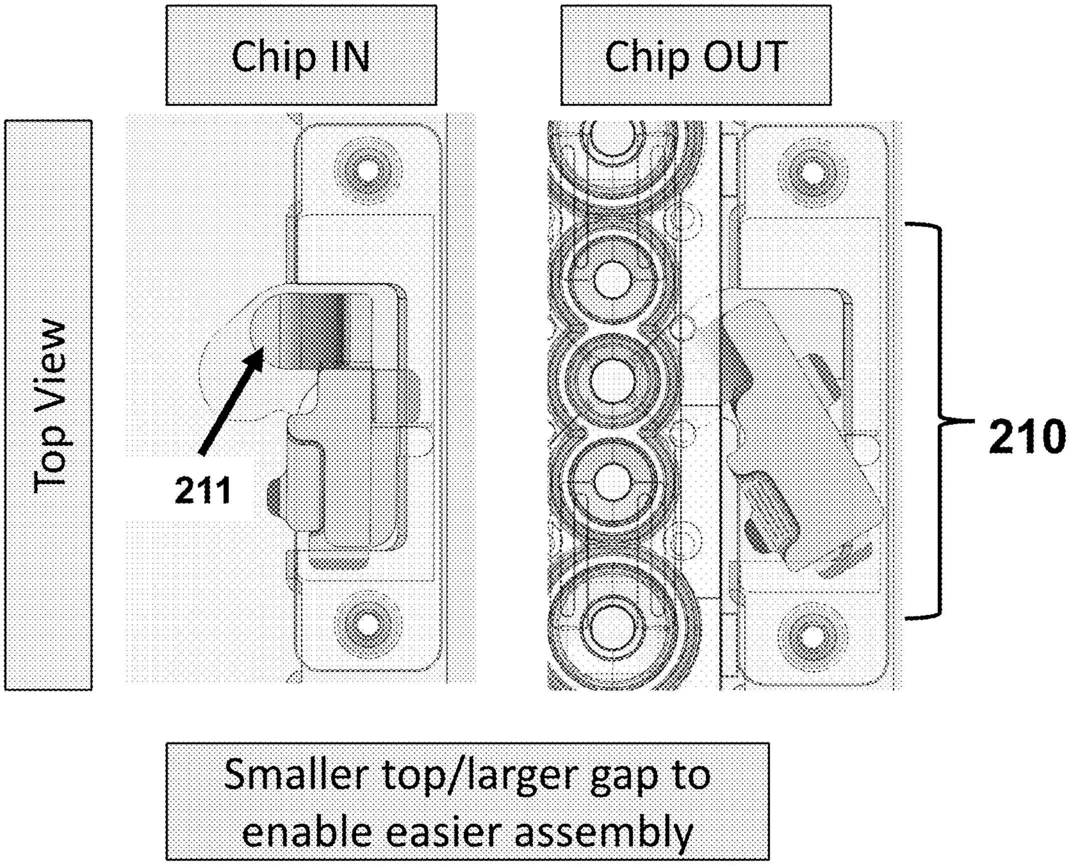
FIGS. 8A-8B are schematic drawings showing top (FIG. 8A) and back (FIG. 8B) views of a latching mechanism 210 including a wedge 211.
Figure 8B:
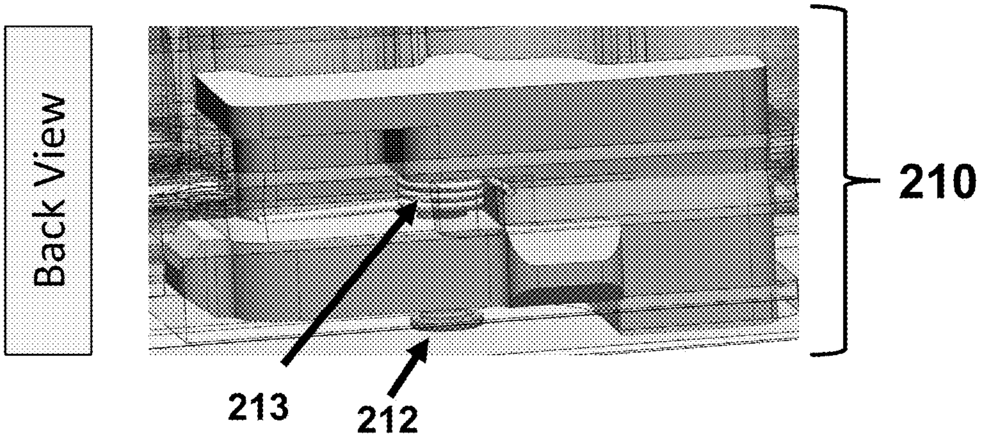

Latching mechanisms may include a pivot pin 212 (see, e.g., FIG. 8B), e.g., about which the wedge and latch are disposed, e.g., at an angle of about 180° (e.g., between about 170 and 190, (e.g., about 171°, 172°, 173°, 174°, 175°, 176°, 177°, 178°, 179°, 180°, 181°, 182°, 183°, 184°, 185°, 186°, 187°, 188°, 189°, or) 190°. The latch and wedge may be formed of a single molded part including a hole or ring feature in which the pivot pin is disposed. A spring, e.g., a torsion spring may be disposed around the pivot pin. A wedge and latch may be mechanically coupled through a lever.

Latching mechanisms of the invention may include one or more springs, e.g., one, two, three, or more springs. A spring may act to hold the latch in position while the latching mechanism is closed or provide a source of mechanical force to press the latch against the chip. Springs may act within the latching mechanism to return a latch to its original position when lateral or annular force is withdrawn. Springs of the invention may be coiled or uncoiled. Springs may deform under stress by compression, e.g., of an open coil (e.g., a compression spring 115) or stretching (e.g., an extension or a torsion spring 213), e.g., opening of a closed coil during operation of the latching mechanism. Uncoiled springs may be deformed by compression, stretching, bending, etc. during operation of the latching mechanism. A spring may be a flexible linkage between two components. A spring may be straight or curved. Suitable springs for use in latching mechanisms of the invention include tension springs, extension springs, flat springs, serpentine springs, torsion springs, volute springs, elliptic or semi-elliptic springs, mainsprings, etc. Exemplary springs for use in latching mechanisms include coiled compression springs 115 (e.g., FIGS. 4A to 4B) and torsion springs 213 (e.g., FIG. 8B). A spring may be a molded part of the latching mechanism. A spring may be molded with the latch and lever or wedge as a single molded part.

A latching mechanism of the invention (e.g., with a wedge or lever) may raise an edge of the microfluidic chip between about 0.1 mm and 3 mm, for example, between about 0.1 mm to 1.0 mm (e.g., about 0.1, 0.2 mm, 0.3 mm, 0.4 mm, 0.5 mm, 0.6 mm, 0.7 mm, 0.8 mm, 0.9 mm, or 1.0 mm), or, e.g., between about 1 mm to 2 mm (e.g., about 1.1 mm, 1.2 mm, 1.3 mm, 1.4 mm, 1.5 mm, 1.6 mm, 1.7 mm, 1.8 mm, 1.9 mm, or 2.0 mm), or, e.g., between about 2 mm to 3 mm (e.g., about 2.0 mm, 2.1 mm, 2.2 mm, 2.3 mm, 2.4 mm, 2.5 mm, 2.6 mm, 2.7 mm, 2.8 mm, 2.9 mm, or 3.0 mm), e.g., about 0.5 mm, 1 mm, or 2 mm. A latching mechanism of the invention (e.g., with a wedge or lever) may raise an edge of the microfluidic chip to make an angle between the base of the receptacle and the bottom of the chip of between about 0.1° to 3°, for example, between about 0.1° to 1.0° (e.g., about 0.1°, 0.2°, 0.3°, 0.4°, 0.5°, 0.6°, 0.7°, 0.8°, 0.9°, or) 1.0°, or, e.g., between about 1° to 2° (e.g., about 1.1°, 1.2°, 1.3°, 1.4°, 1.5°, 1.6°, 1.7°, 1.8°, 1.9°, or) 2.0°, or, e.g., between about 2° to 3° (e.g., about 2.0°, 2.1°, 2.2°, 2.3°, 2.4°, 2.5°, 2.6°, 2.7°, 2.8°, 2.9°, or) 3.0°, e.g., about 0.5°, 1°, or 2°.

Microfluidic Devices

The microfluidic device may be configured and used for various applications, for example, to generate droplets, to evaluate and/or quantify the presence of a biological particle or organism (e.g., microbiome analysis, environmental testing, food safety testing, epidemiological analysis), to process a single analyte (e.g., bioanalytes, e.g., RNA, DNA, or protein) or multiple analytes (e.g., bioanalytes, e.g., DNA and RNA, DNA and protein, RNA and protein, or RNA, DNA and protein) from a single cell or from multiple cells, to process, for example, proteomic, transcriptomic, and/or genomic analysis of a cell or population of cells (e.g., simultaneous proteomic, transcriptomic, and/or genomic analysis of a cell or population of cells), or to modify analytes. Exemplary microfluidic devices for producing droplets are described in WO 2019/040637, WO 2020/123657, WO 2020/176882, and WO 2015/157567, the microfluidic devices of which are incorporated by reference.

Kits and Systems

Holders provided by invention may be combined with various external components, e.g., microfluidic chips, pumps, reservoirs, bar code readers, computers, robotic manipulators or controllers, EEPROM (electrically erasable programmable read-only memory) readers, magnetic strip readers, reagents, e.g., analyte moieties, liquids, particles (e.g., beads), and/or sample in the form of kits and systems.

Methods

The methods described herein allow the removal of chips from a holder in a controlled manner, e.g., minimizing the risk of causing damage to the chip or its contents. Methods of the invention involve applying lateral or annular pressure to withdraw a latch which, through mechanical couplings in the latching mechanism, also causes the chip to be raised (e.g., by interaction of a mechanically coupled lever or wedge with the chip).

Methods can include holders with latching mechanisms that include a lever, with an effort side mechanically coupled to the latch such that lateral or annular motion of the latch causes a resistance side of the lever to raise. The raising lever may lift the microfluidic chip by contacting the bottom of the chip under an edge, or a feature on the edge 116 that is disposed to catch the lever (e.g., a lip, ridge, or overhang).

Applying lateral or annular pressure to the latch may cause a projection on the latch (e.g., a ball, hemisphere, ellipsoid, etc.) that is disposed at least partially within a groove in the lever to push against a side of the groove that is on the effort side of the lever, thereby raising the resistance side and the microfluidic chip.

Certain embodiments of the method may involve transferring lateral or annular pressure from the latch to the lever through a compound lever in the latching mechanism, e.g., one including two or more mechanically coupled pivot points. For example, transferring lateral or annular pressure from the latch to the effort side of the lever through one or more (e.g., two, three, or four or more) mechanically coupled levers, or a lever with multiple pivot points.

The latching mechanism may include a wedge (e.g., with a straight or curved slope) mechanically coupled to the latch such that lateral or annular motion of the latch, e.g., drives the wedge into a void at least partially underneath the chip. The wedge may have a height that is greater than the depth of the void, causing the microfluidic chip to be raised, e.g., by the chip sliding up the straight or curved slope of the wedge.

Methods may include stressing a spring in the latching mechanism, e.g., by lateral or annular pressure, e.g., to withdraw the latch and raise the lever or drive the wedge into the void. Methods may include causing a lever to pivot on a fulcrum or a wedge and latch to pivot around a pivot pin when pressing laterally or annularly on the latch, thereby transferring mechanical action from the latch to the lever or wedge. Springs may resist either of these motions.

Methods may include raising the edge of the microfluidic chip in contact with the lever or wedge to a particular height, or to make a particular angle with the base. For example, the method may include raising an edge of the microfluidic chip between about 0.1 mm and 3 mm, for example, between about 0.1 mm to 1.0 mm (e.g., about 0.1, 0.2 mm, 0.3 mm, 0.4 mm, 0.5 mm, 0.6 mm, 0.7 mm, 0.8 mm, 0.9 mm, or 1.0 mm), or, e.g., between about 1 mm to 2 mm (e.g., about 1.1 mm, 1.2 mm, 1.3 mm, 1.4 mm, 1.5 mm, 1.6 mm, 1.7 mm, 1.8 mm, 1.9 mm, or 2.0 mm), or, e.g., between about 2 mm to 3 mm (e.g., about 2.0 mm, 2.1 mm, 2.2 mm, 2.3 mm, 2.4 mm, 2.5 mm, 2.6 mm, 2.7 mm, 2.8 mm, 2.9 mm, or 3.0 mm), e.g., about 0.5 mm, 1 mm, or 2 mm. Alternatively or in addition, the method may involve raising an edge of the microfluidic chip to make an angle between the base of the receptacle and the bottom of the chip of between about 0.1° to 3°, for example, between about 0.1° to 1.0° (e.g., about 0.1°, 0.2°, 0.3°, 0.4°, 0.5°, 0.6°, 0.7°, 0.8°, 0.9°, or) 1.0°, or, e.g., between about 1° to 2° (e.g., about 1.1°, 1.2°, 1.3°, 1.4°, 1.5°, 1.6°, 1.7°, 1.8°, 1.9°, or) 2.0°, or, e.g., between about 2° to 3° (e.g., about 2.0°, 2.1°, 2.2°, 2.3°, 2.4°, 2.5°, 2.6°, 2.7°, 2.8°, 2.9°, or) 3.0°, e.g., about 0.5°, 1°, or 2°.

The application of lateral or annular pressure to the latch may be enhanced by the inclusion of features to increase friction between a top portion of the latch and a finger or thumb (e.g., ridges, rubberized portions, kerfs, chevrons, indents, roughened portions, etc.).

A cover which at least partially covers the microfluidic chip when in the receptacle may need to first be lifted before pressing laterally or annularly on the latch to release the chip. The cover may be rotatable to act as a stand to position the holder and the chip at a desired angle, as described herein.

EXAMPLES

Example 1

Figure 1:
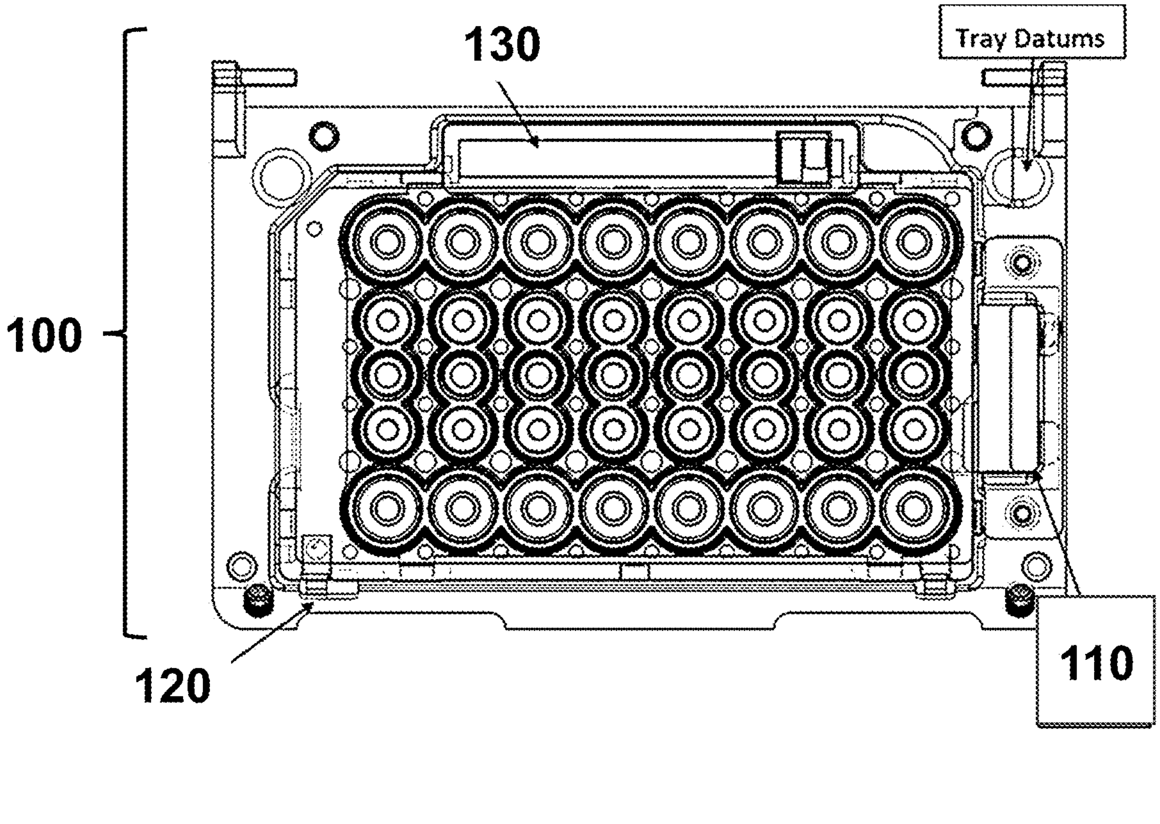
FIG. 1 is a schematic drawing showing a top-down view of a microfluidic chip holder 100 of the invention with a microfluidic chip in the receptacle.
Figure 2:
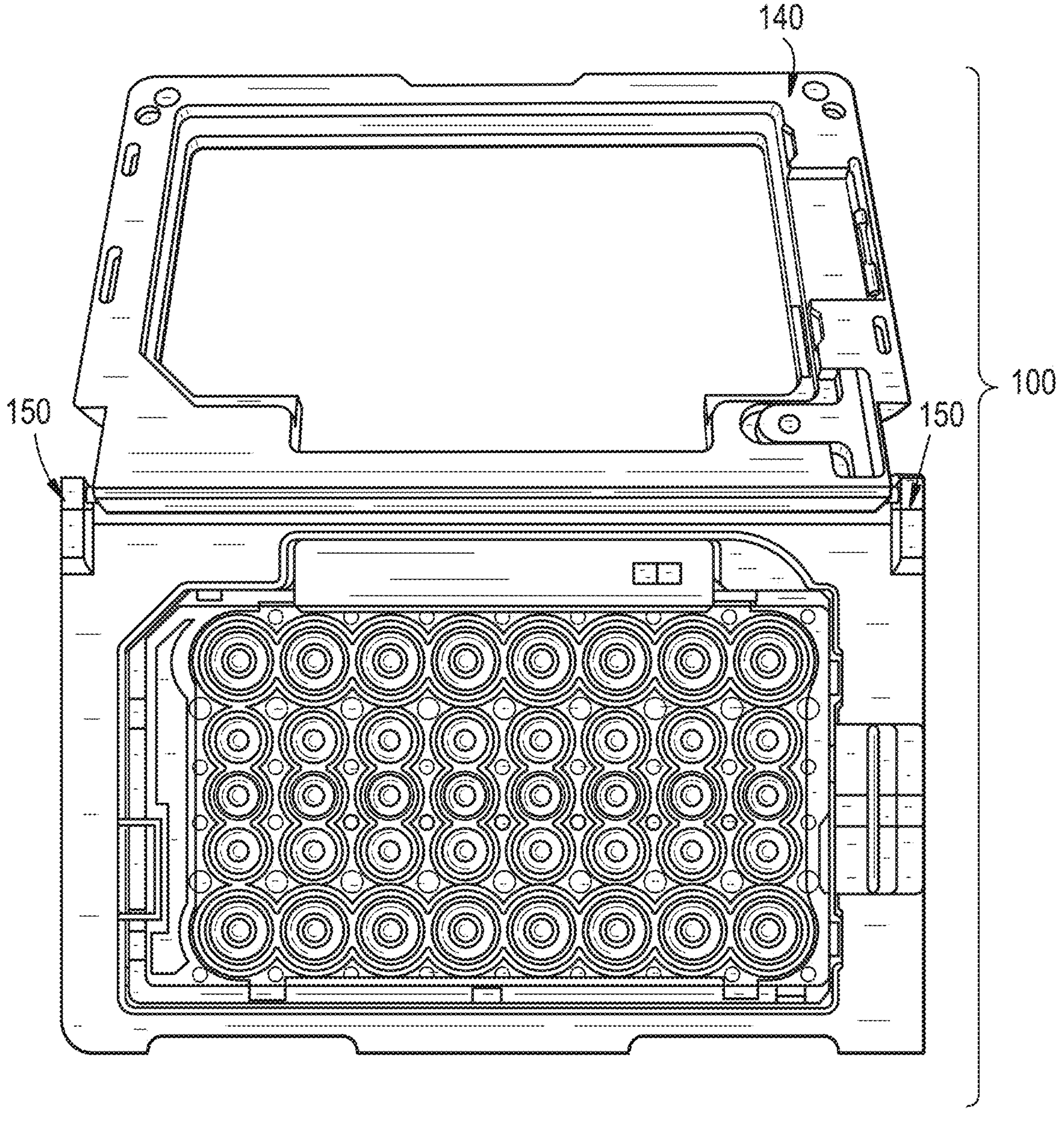
FIG. 2 is a photograph showing a top-down view of a microfluidic chip holder 100 of the invention including a cover 140 with a microfluidic chip in the receptacle and the cover open.
Figure 3A:
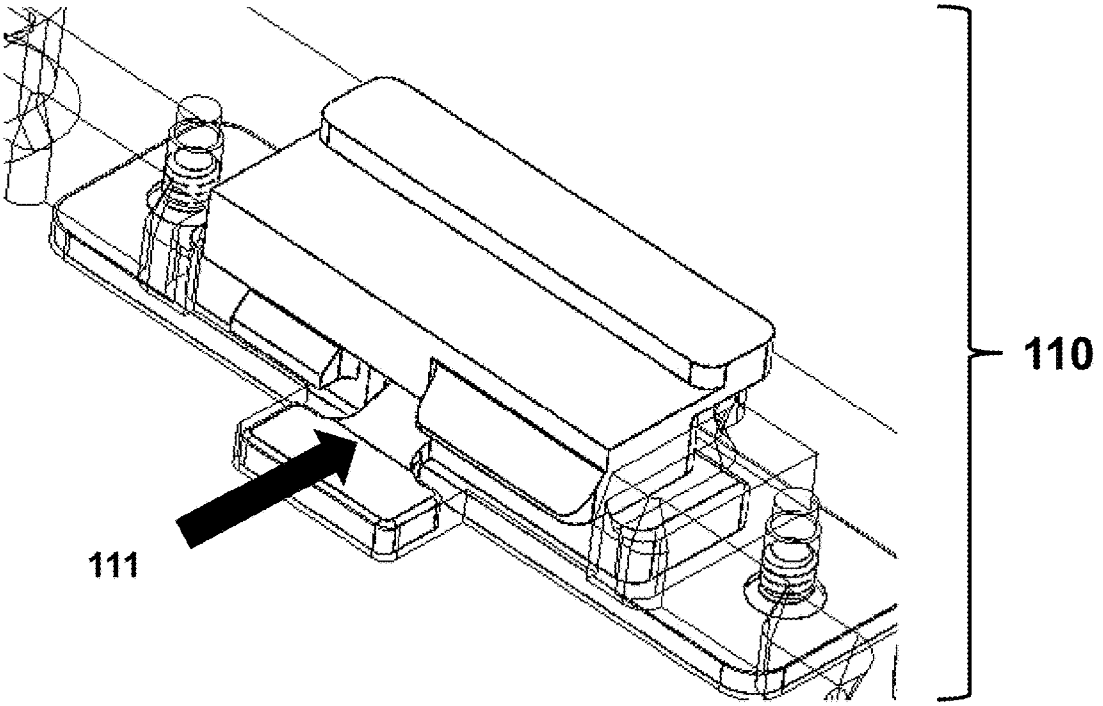
FIGS. 3A-3B are schematic drawings showing a latching mechanism 110 of the invention featuring a lever 111 in the closed (FIG. 3A) and open (FIG. 3B) positions.
Figure 3B:
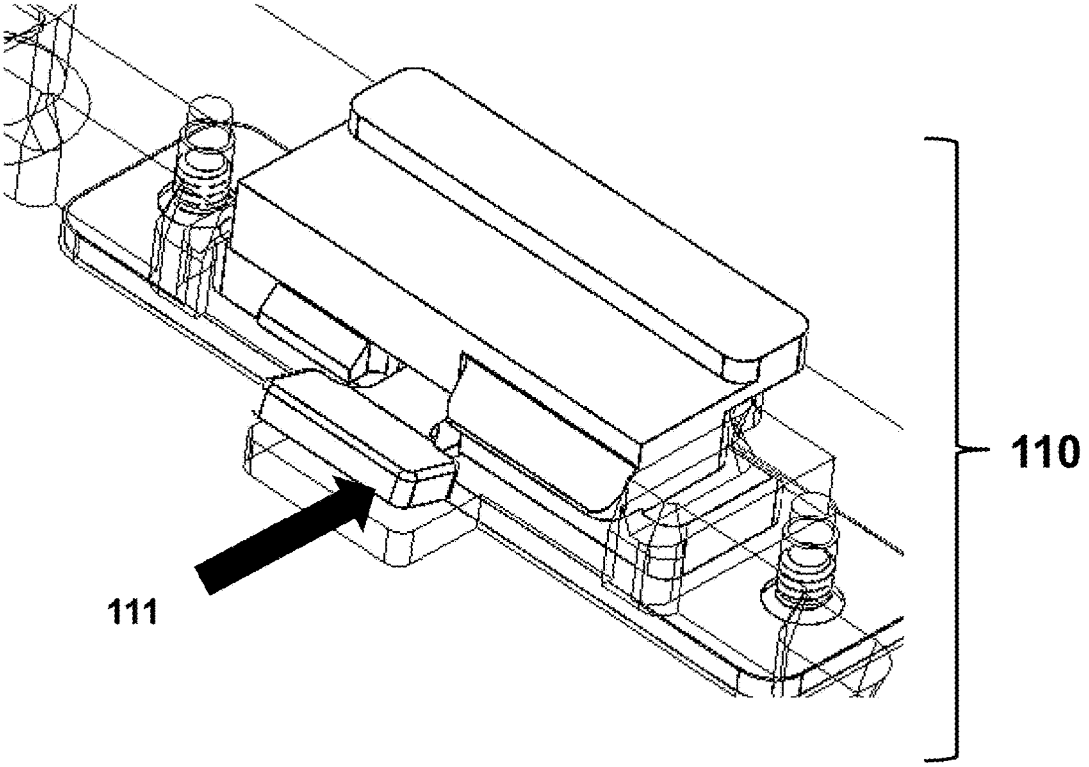
Figure 4A:
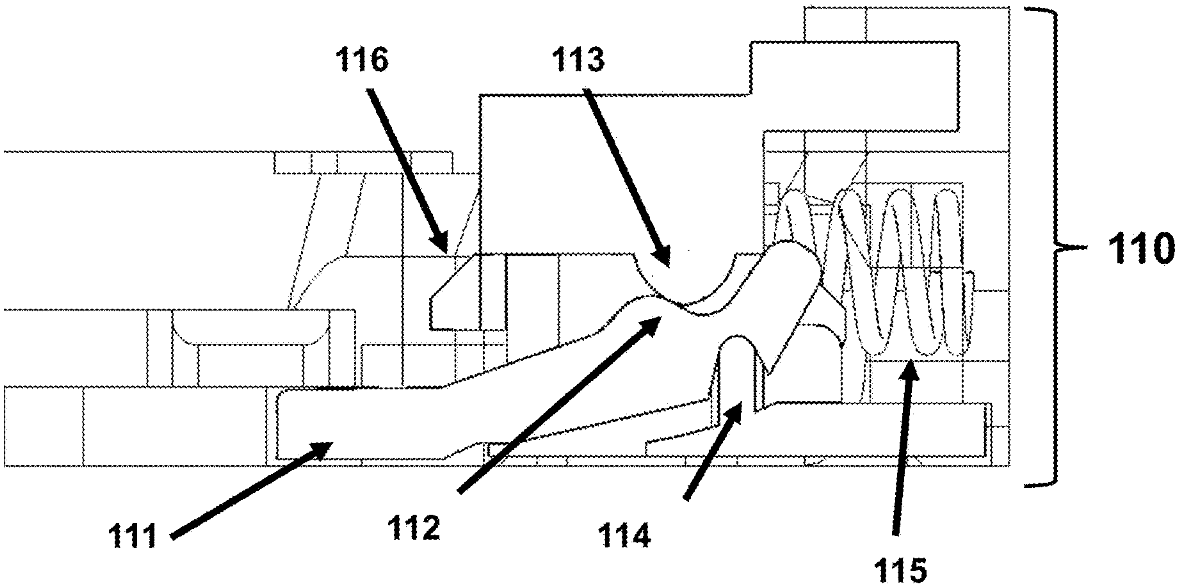
FIGS. 4A-4B are schematic drawings showing a side view of a latching mechanism 110 of the invention in the closed (FIG. 4A) and open (FIG. 4B) configurations.
Figure 4B:
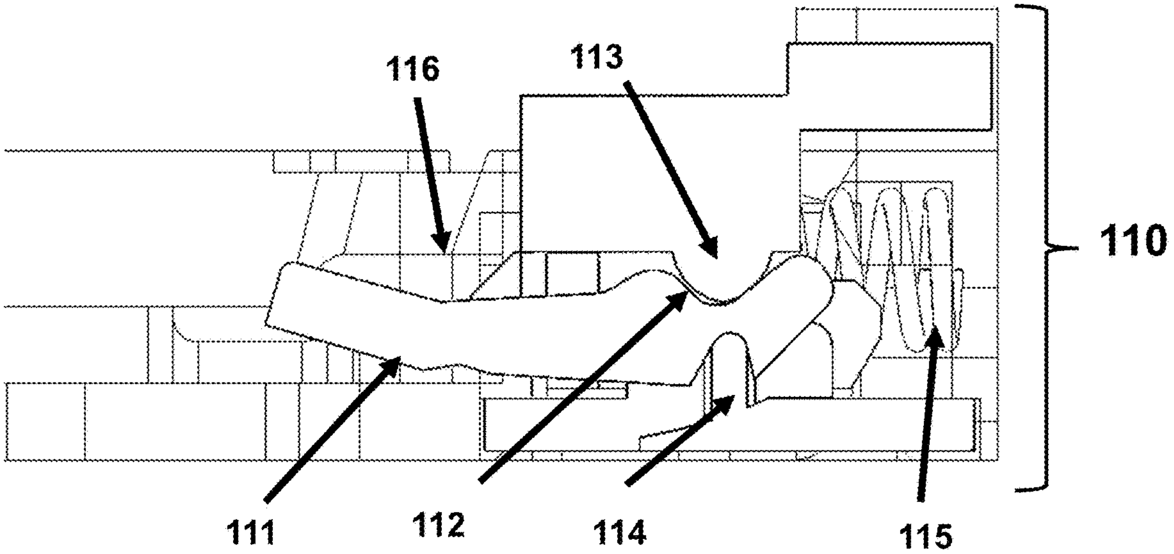

An example of a holder 100 with a latching mechanism 110 featuring a lever 111 is shown in FIG. 1 and FIG. 2. FIG. 1 shows a top-down view of the microfluidic chip holder with a microfluidic chip in the receptacle. FIG. 2 is a photograph of the microfluidic chip including a cover 140 with a microfluidic chip in the receptacle and the cover open. A schematic drawing of a latching mechanism 110 is shown in FIGS. 3A-3B. The mechanism is shown with the lever 111 in the closed (FIG. 3A) and open (FIG. 3B) positions. A side view of the latching mechanism 110 is shown in FIGS. 4A-4B. The mechanism is shown in in the closed (FIG. 4A) and open (FIG. 4B) configurations.

Figure 5:
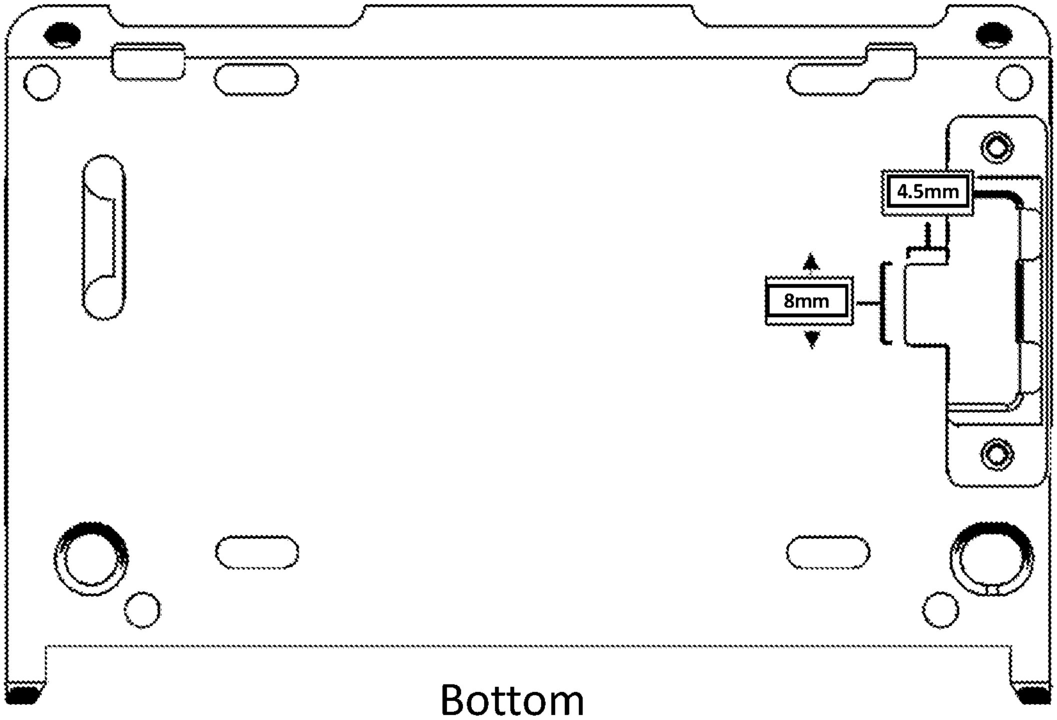
FIG. 5 is a schematic drawing showing a bottom view schematic of a holder of the invention.

During opening, lateral pressure on the latch causes a rounded protrusion 113 under the latch to press against the effort side of the lever 111 above the fulcrum 114, which in turn causes the resistance side of the lever 111 to rise out of a void in the base of the receptacle, thereby lifting a chip in the receptacle. When the pressure is released, the spring 115 pushes the latch and its protrusion back to the closed position. To complete this motion, the protrusion 113 on the latch engages with the resistance side of the lever 111, thereby forcing the lever 111 downward when the protrusion 113 on the latch is moved back into the latch-closed position by the spring 115. FIG. 5 shows a bottom view schematic of a holder of the invention.

Example 2

Figure 6:
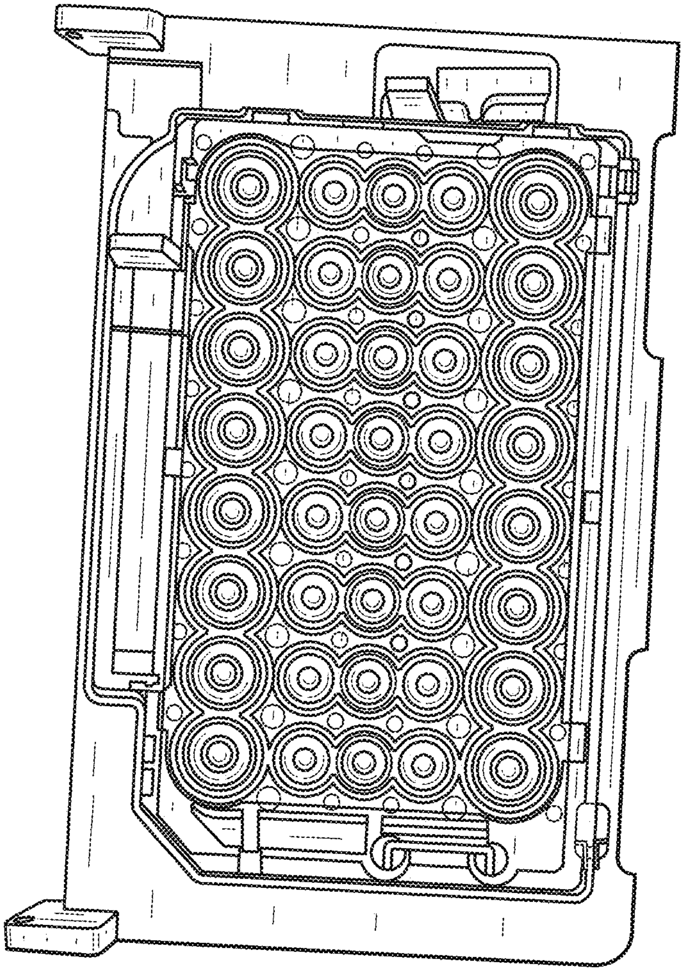
FIG. 6 is a photograph showing a top-down view of a microfluidic chip holder of the invention with a microfluidic chip in the receptacle.
Figure 7A:
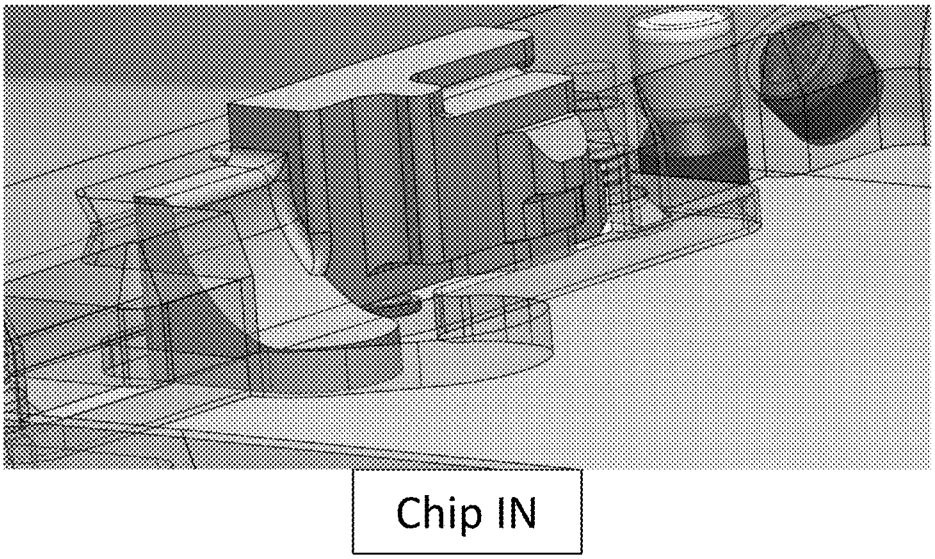
FIGS. 7A-7B are schematic drawings showing a latching mechanism of the invention featuring a wedge.
Figure 7B:
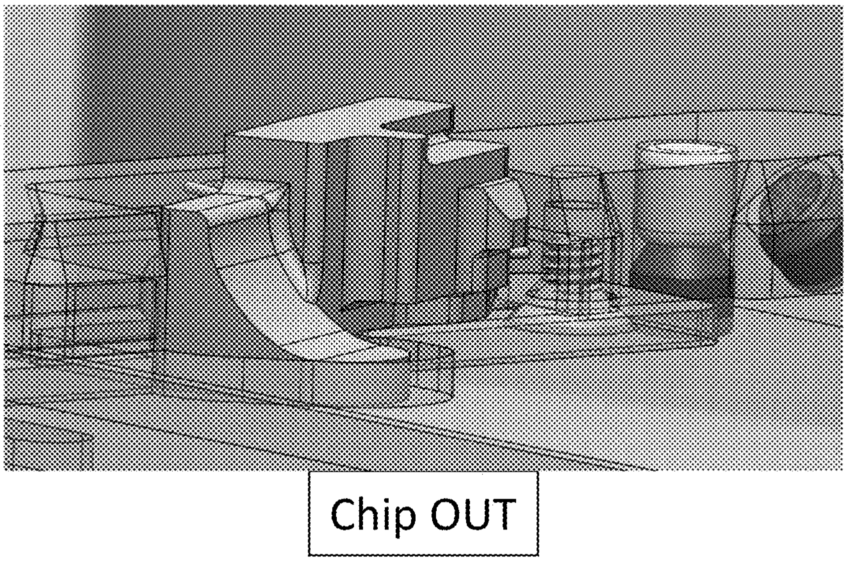

An example of a holder with a latching mechanism 210 featuring a wedge 211 is shown in FIGS. 6-8B. FIG. 6 is a photograph showing a top-down view of the microfluidic chip holder with a microfluidic chip in the receptacle. Some details of the latching mechanism 210 are shown in the schematic drawings of FIGS. 7A-7B and 8A-8B. In this mechanism, the latch and wedge 211 are formed from a single piece disposed about a pivot pin 212, with the latch and wedge 211 disposed either side of the pin 212. A torsion spring 213 is also disposed about the pin 212 (see, e.g., FIG. 8B).

During release, lateral or annular pressure on the latch causes the latch and wedge 211 to turn about the pivot pin 212, thereby driving the wedge 211 into the void in the base of the holder. The wedge has a curved slope of greater height than the depth of the void (see, e.g., FIG. 7A and FIG. 7B), causing a chip in the receptacle to rise by sliding up the wedge 211 as the wedge 211 is driven into the void. The torsion spring 213 is stressed during the latch opening (e.g., chip out) process and returns the wedge 211 and latch to the closed positions when the lateral or annular pressure is released. The spring 213 may also have an added benefit of making the raising of the chip smoother by partially resisting the lateral or annular pressure and thus slowing the progress of the wedge 211 into the void.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

Other embodiments are in the claims.

What is claimed is:

1. A method of separating a microfluidic chip from a microfluidic chip holder, the method comprising:

a) providing the microfluidic chip holder comprising i) a receptacle with a base that holds the microfluidic chip in a planar conformation and ii) a latching mechanism comprising a latch that holds the chip in the receptacle and is mechanically coupled to an effort side of a lever with a resistance side of the lever under an edge or a catching feature on the edge of the chip;

b) pressing laterally or annularly on the latch to withdraw the latch and apply downward force on the effort side of the lever, thereby releasing and raising the microfluidic chip; and c) lifting the raised microfluidic chip out of the microfluidic chip holder.

2. The method of claim 1, wherein step (b) comprises raising the edge of the microfluidic chip in contact with the lever such that the microfluidic chip and the base of the chip holder make an angle that is less than 2° or raising the edge of the microfluidic chip about 0.5 to 2 mm from the base.

3. The method of claim 1, wherein the latching mechanism comprises a spring and the pressing of step (b) applies stress to the spring to withdraw the latch; or wherein the latching mechanism comprises a fulcrum between the effort and resistance sides of the lever and wherein step (b) comprises causing the lever to pivot on the fulcrum when pressing laterally or annularly on the latch.

4. The method of claim 1, wherein step (b) comprises annularly or laterally moving a projection on the latch that is disposed at least partially within a groove in the lever against the effort side of the lever, thereby raising the resistance side of the lever and the microfluidic chip.

5. A microfluidic chip holder comprising:

a) a receptacle with a base configured to hold a microfluidic chip in a substantially planar conformation; and b) a latching mechanism comprising a latch and a lever having an effort side and a resistance side, wherein the latch is mechanically coupled to the effort side of the lever and the resistance side of the lever is disposed beneath an edge or a catching feature on the edge of the microfluidic chip when in the receptacle, wherein lateral or annular movement of the latch applies downward force on the effort side of the lever which raises the resistance side of the lever and ejects the microfluidic chip from the receptacle.

6. The holder of claim 5, wherein the lever is configured to raise the edge of the microfluidic chip to make an angle that is less than 2° with the base; or wherein the lever is configured to raise the edge of the microfluidic chip by about 0.5 to 2 mm.

7. The holder of claim 5, wherein the lever is configured to raise the edge of the microfluidic chip by about 1 mm.

8. The holder of claim 5, wherein the latching mechanism further comprises a spring or a fulcrum; or wherein the lever comprises a groove and the latch comprises a projection disposed at least partially within the groove; or wherein the lever is a compound lever.

9. The holder of claim 5, further comprising a cover that at least partially covers the microfluidic chip when in the receptacle.

10. The holder of claim 9, wherein the cover is rotatable behind the holder to act as a stand.

* * * * *